3,361,817
2-(ALKOXYALKYL)AMINO-2-PHENYL-CYCLO-
HEXANONES AND SALTS THEREOF
Yvon J. L'Italien, Plymouth, Mich., assignor to Parke,
Davis and Company, Detroit, Mich., a corporation of
Michigan
No Drawing. Filed July 30, 1965, Ser. No. 476,199
6 Claims. (Cl. 260—570.5)

The present invention relates to new phenylcyclohexanone compounds substituted by a lower alkoxyalkylamino group. More particularly, the invention relates to new 2-alkoxyalkylamino - 2 - phenylcyclohexanone compounds which in free base form can be represented by the formula

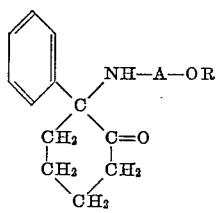

to acid-addition salts thereof and to methods for the production of the foregoing compounds. In this formula A represents a lower alkylene radical separating the groups to which it is attached by at least 2 carbon atoms; R represents a lower alkyl radical; and A and R contain together a total of fewer than 6 carbon atoms. Thus the group, —A—OR, represents an alkoxyalkyl radical of fewer than 6 carbon atoms such as methoxyethyl, ethoxyethyl, methoxypropyl, ethoxypropyl, or propoxyethyl.

In accordance with the invention, the foregoing compounds can be produced by heating a ketimine compound of the formula

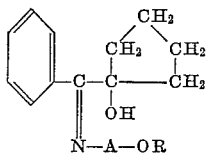

or an acid-addition salt thereof, where A and R are as defined before. This process is a thermal rearrangement reaction. It can be carried out, if desired, in the absence of a solvent, but it is preferable to employ a solvent. Some examples of satisfactory solvents are high boiling hydrocarbons such as hexacosane and biphenyl; high boiling ethers such as diphenyl ether and pentyl phenyl ether; high boiling neutral petroleum fractions; mineral oils; and mixtures thereof. A preferred solvent is the eutectic mixture containing 73.5% of diphenyl ether and 26.5% of biphenyl. The process is carried out by heating at a temperature of about 175–275° C. or optionally somewhat higher, for 1 to 15 minutes. The preferred reaction conditions are about 200–250° C. for 5 to 10 minutes, the higher temperatures being used for rearrangement of the free base and the lower temperatures being used for rearrangement of an acid-addition salt. In general, use of the starting material in acid-addition salt form is preferred in this process. The product is isolated either as the free base or as an acid-addition salt by adjustment of the pH as required.

The ketimines employed as starting materials in the foregoing process can be prepared by a variety of methods. For example, cyclopentyl phenyl ketone is monobrominated and the resulting 1-bromocyclopentyl phenyl ketone is reacted with methylamine to give 1-hydroxycyclopentyl phenyl N-methylketimine. The latter compound is hydrolyzed by heating with dilute mineral acid to give 1-hydroxycyclopentyl phenyl ketone. The same compound can also be prepared by reacting phenyllithium or phenylmagnesium bromide with the tetrahydro-2-pyranyl ether of cyclopentanone cyanohydrin in anhydrous ether followed by hydrolyzing the product with hot, dilute mineral acid. 1-hydroxycyclopentyl phenyl ketone is then reacted with a lower alkoxyalkylamine to give the 1-hydroxycyclopentyl phenyl N-(alkoxyalkyl)ketimines used as starting materials. These procedures are illustrated in greater detail below.

Also in accordance with the invention, the compounds of the invention can be produced by reacting 2-amino-2-phenylcyclohexanone having in free base form the formula

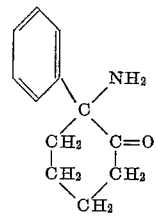

with a compound of the formula

RO—A—X where A and R are as defined before and X represents halogen, preferably bromine. The reaction is normally carried out in the presence of a base such as an alkali metal carbonate or bicarbonate, an alkaline earth metal carbonate, oxide or hydroxide, or an organic tertiary amine. At least approximately one equivalent and preferably up to a moderate excess of the alkoxyalkyl halide is used. Some suitable solvents for the reaction are lower aliphatic ketones such as acetone, methyl ethyl ketone, and diethyl ketone; lower alkanols such as methanol, ethanol, and isopropyl alcohol; and other relatively unreactive solvents such as tetrahydrofuran, dioxane, acetonitrile, and dimethylformamide. Examples of preferred solvents are acetone and acetonitrile.

The time and temperature required for the reaction vary somewhat with the alkoxyalkyl halide and solvent used, but in general the reaction is substantially complete when carried out at a temperature of from 15 to 125° C. for from 1 to 72 hours, the longer reaction times being used with the lower temperatures. Preferred reaction conditions are 55–85° C. for 12 to 24 hours. The reaction product is isolated directly as the free base, or following acidification, as an acid-addition salt.

The free bases of the invention form acid-addition salts with a variety of inorganic and organic acids. Pharmaceutically-acceptable acid-addition salts are formed by reaction with such acids as hydrochloric, hydrobromic, sulfuric, phosphoric, acetic, succinic, citric, maleic, and pamoic acids. The acid-addition salts are converted to the free bases by reaction with a base such as sodium hydroxide, potassium carbonate, or potassium bicarbonate. The free bases and their acid-addition salts differ in solubility properties but in general are otherwise equivalent for the purposes of the invention.

The compounds of the invention are useful as pharmacological agents and as chemical intermediates. When used as pharmacological agents they produce a depressant effect on the central nervous system. They are anesthetic agents capable of producing general anesthesia and in addition are anticonvulsant agents. Their activity as anticonvulsant agents can be measured by determining their ability to prevent the occurrence of convulsions following electroshock. A preferred anticonvulsant compound of the invention is 2-(3-methoxypropyl)amino-2-phenylcyclohexanone. As anesthetic agents the compounds of the invention exhibit moderate potency with short to medium duration of action. When compared with anesthetic agents having somewhat related chemical structures the compounds of the invention show a relatively high ratio of potency to duration of action. The compounds are active on both oral and parenteral administration.

The invention is illustrated by the following examples.

EXAMPLE 1

An excess of dry hydrogen chloride is passed into a solution of 25 g. of 1-hydroxycyclopentyl phenyl N-(2-ethoxyethyl)ketimine in 300 ml. of a mixture of 73.5% diphenyl ether and 26.5% biphenyl. The resulting mixture containing the ketimine hydrochloride is heated rapidly to 200° C., held at that temperature for 10 minutes, cooled to room temperature, and diluted with ether. The insoluble product is collected on a filter. It is 2-(2-ethoxyethyl)amino - 2 - phenylcyclohexanone hydrochloride; M.P. 208–209° C. after crystallization from isopropyl alcohol-ether. The free base is obtained by dissolving the hydrochloride in water, adding potassium carbonate, and extracting with ether. The hydrobromide and sulfate are obtained by treating the free base with dry hydrogen bromide and with sulfuric acid. A salt with citric acid is obtained by mixing a solution of the free base in methanol with a solution of citric acid in methanol and concentrating the mixture.

By the foregoing procedure, with the substitution of an equal weight of 1-hydroxycyclopentyl phenyl N-(3-methoxypropyl)ketimine for the 1-hydroxycyclopentyl phenyl N-(2-ethoxyethyl)ketimine, the product obtained is 2-(3-methoxypropyl)amino-2-phenylcyclohexanone hydrochloride; M.P. 176–177° C.

EXAMPLE 2

A mixture of 18.9 g. of 2-amino-2-phenylcyclohexanone, 23.5 g. of 2-methoxyethyl bromide, 42 g. of potassium carbonate, 0.5 g. of potassium iodide, and 300 ml. of acetonitrile is stirred and heated at reflux for 20 hours. The mixture is cooled, diluted with a large volume of ether, and filtered to remove inorganic salts. The filtrate is washed with water and extracted with a slight excess of dilute hydrochloric acid. The acid extract is treated with charcoal and filtered. The filtrate is made basic with aqueous sodium hydroxide and extracted with ether. The ether extract is dried and treated with a slight excess of dry hydrogen chloride. The insoluble precipitate is collected on a filter; it is 2-(2-methoxyethyl)amino-2-phenylcyclohexanone hydrochloride. Following crystallization from isopropyl alcohol-ether it has M.P. 176–177° C. The free base is obtained by dissolving the hydrochloride in water, adding sodium carbonate, and extracting with ether. A salt with tartaric acid is obtained by reacting the free base with tartaric acid in methanol.

*Starting materials*

With continuous stirring, 160 g. of bromine is added in small portions to a stirred solution of 174 g. of cyclopentyl phenyl ketone in 600 ml. of carbon tetrachloride, allowing the bromine color to be discharged after each addition. The resulting solution is evaporated at reduced pressure to leave a residue of 1-bromocyclopentyl phenyl ketone; M.P. 60–61° C.

With stirring, 235 g. of 1-bromocyclopentyl phenyl ketone is added in small portions to 150 ml. of liquid methylamine maintained at −60 to −50° C. The solution is allowed to warm to room temperature and is then diluted with an equal volume of ether and evaporated. Dilution with ether and evaporation is repeated 3 more times. The residue again is diluted with ether and insoluble methylamine hydrobromide is removed by filtration. The filtrate is evaporated to dryness to give a residue of 1-hydroxycyclopentyl phenyl N-methylketimine; M.P. 66–68° C. following crystallization from petroleum ether.

A solution of 102 g. of 1-hydroxycyclopentyl phenyl N-methylketimine in 1000 ml. of 1 N hydrochloric acid is heated at 90–100° C. for 1 hour and is then cooled and extracted with ether. The ether extract is washed with water, dried, and evaporated and the residue distilled under reduced pressure. A fraction of 1-hydroxycyclopentyl phenyl ketone is obtained; B.P. 92–94° C. at 0.15 mm.

A solution of 18.2 g. of 1-hydroxycyclopentyl phenyl ketone and 15 g. of 2-ethoxyethylamine in 250 ml. of toluene is heated at reflux with continuous removal of the water formed in the reaction until the theoretical amount of water has been collected. The toluene solution is evaporated under reduced pressure to give a residue of 1-hydroxycyclopentyl phenyl N-(2-ethoxyethyl)-ketimine. This product has infrared absorption maximum at 1650 reciprocal centimeters and is suitable for use without further purification. By the foregoing procedure, with the substitution of an equal weight of 3-methoxypropylamine for the 2-ethoxyethylamine, the product obtained is 1-hydroxycyclopentyl phenyl N-(3-methoxypropyl)ketimine; infrared absorption maximum at 1650 reciprocal centimeters.

A solution of phenyllithium is prepared from 470 g. of bromobenzene and 48 g. of lithium in 3 liters of ether. With stirring, 400 g. of the tetrahydro-2-pyranyl ether of cyclopentanone cyanohydrin is added and the mixture is stirred for 4 hours at room temperature. With continued stirring it is diluted with 600 ml. of water and the phases are then separated. The ether phase is washed with water, dried, and evaporated. The residue is heated on a steam bath for 30 minutes with 2 liters of 2 N hydrochloric acid and the mixture is cooled and extracted with ether. The ether extract is washed with water, dried, and evaporated and the residue is distilled under reduced pressure. 1-hydroxycyclopentyl phenyl ketone is collected as a fraction having B.P. 92–94° C. at 0.15 mm.

I claim:

1. A member of the class consisting of compounds of the formula

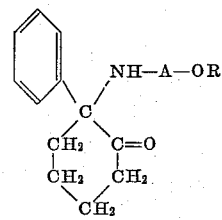

and pharmaceutically-acceptable acid-addition salts thereof; where A is lower alkylene separating the groups to which it is attached by at least 2 carbon atoms; R is lower alkyl; and A and R contain together a total of fewer than 6 carbon atoms.

2. 2-(2-ethoxyethyl)amino-2-phenylcyclohexanone.
3. 2 - (2 - ethoxyethyl)amino - 2 - phenylcyclohexanone hydrochloride.
4. 2-(3-methoxypropyl)amino-2-phenylcyclohexanone.
5. 2 - (3 - methoxypropyl)amino-2-phenylcyclohexanone hydrochloride.
6. 2-(2-methoxyethyl)amino-2-phenylcyclohexanone.

References Cited

UNITED STATES PATENTS 3,254,124  5/1966  Stevens _____ 260—570.5

FOREIGN PATENTS 861,350  2/1961  Great Britain.

CHARLES B. PARKER, *Primary Examiner.*

R. V. HINES, *Assistant Examiner.*